(12) United States Patent
Gemoules

(10) Patent No.: US 10,095,213 B2
(45) Date of Patent: *Oct. 9, 2018

(54) SYSTEM AND METHOD FOR DESIGNING SCLERAL LENSES

(71) Applicant: Gregory Gemoules, Coppell, TX (US)

(72) Inventor: Gregory Gemoules, Coppell, TX (US)

(*) Notice: Subject to any disclaimer, the term of this patent is extended or adjusted under 35 U.S.C. 154(b) by 138 days.

This patent is subject to a terminal disclaimer.

(21) Appl. No.: 15/216,062

(22) Filed: Jul. 21, 2016

(65) Prior Publication Data

US 2016/0327928 A1    Nov. 10, 2016

Related U.S. Application Data

(63) Continuation of application No. 14/032,920, filed on Sep. 20, 2013, now Pat. No. 9,421,721.

(51) Int. Cl.
*G06F 19/00*    (2018.01)
*G05B 19/23*    (2006.01)
*B29D 11/00*    (2006.01)
*G05B 15/02*    (2006.01)

(52) U.S. Cl.
CPC ........ *G05B 19/23* (2013.01); *B29D 11/00105* (2013.01); *B29D 11/00961* (2013.01); *G05B 15/02* (2013.01); *G05B 2219/36204* (2013.01)

(58) Field of Classification Search
CPC ............. G05B 19/23; G05B 15/02; G05B 2219/36204; B29D 11/00105; B29D 11/00961
See application file for complete search history.

(56) References Cited

U.S. PATENT DOCUMENTS

| 5,200,121 A | 4/1993 | Hagmann et al. |
| 5,452,031 A | 9/1995 | Ducharme |
| 5,570,142 A | 10/1996 | Lieberman |
| 5,861,114 A | 1/1999 | Roggman et al. |
| 5,872,613 A | 2/1999 | Blum et al. |

(Continued)

FOREIGN PATENT DOCUMENTS

| AU | 2007275829 | 1/2006 |
| EP | 1752281 | 2/2007 |

(Continued)

OTHER PUBLICATIONS

Eef van der Worp, A Guide to Schleral Lens Fitting (2 ed.), Pacific University, Common Knowledge, 2015.

(Continued)

*Primary Examiner* — Michael D Masinick

(57) ABSTRACT

A system and method for designing scleral lenses includes a computer, a camera and a lathe connected by a network. The camera captures a set of sagittal images at each of a set of sagittal planes of an eye. A combined sagittal image is created from each set of sagittal images. A spline curve is defined for each combined sagittal image creating a set of spline curves. A set of back surface curves is created from the set of spline curves. A back lens surface is generated from the set of surface curves. A front lens surface is generated adjacent the back lens surface. A point cloud is generated from the back lens surface and the front lens surface. The point cloud is converted to a lens image. The lens is converted to a text file for use by the lathe to cut the scleral lens.

19 Claims, 19 Drawing Sheets

(56) References Cited

U.S. PATENT DOCUMENTS

| | | |
|---|---|---|
| 5,880,809 A | 3/1999 | Lieberman et al. |
| 5,953,098 A | 9/1999 | Lieberman et al. |
| 6,039,899 A | 3/2000 | Martin et al. |
| 6,457,826 B1 | 10/2002 | Lett |
| 6,511,617 B1 | 1/2003 | Martin et al. |
| 6,595,639 B1 | 7/2003 | Ho et al. |
| 7,048,759 B2 | 5/2006 | Bogaert et al. |
| 7,152,975 B2 | 12/2006 | Ho et al. |
| 7,275,827 B2 | 10/2007 | Jean et al. |
| 7,296,890 B2 | 11/2007 | Svochak et al. |
| 7,497,572 B2 | 3/2009 | Ye et al. |
| 7,625,085 B2 | 12/2009 | Ye et al. |
| 7,828,431 B2 | 11/2010 | Ho et al. |
| 7,862,176 B2 | 1/2011 | Gemoules et al. |
| 2012/0062844 A1 | 3/2012 | Svochak et al. |
| 2012/0147321 A1 | 6/2012 | Portney |
| 2013/0297015 A1* | 11/2013 | Johns ................. A61F 2/14 623/4.1 |
| 2015/0088297 A1 | 3/2015 | Gemoules |

FOREIGN PATENT DOCUMENTS

| | | |
|---|---|---|
| EP | 1781461 | 5/2007 |
| GB | 655901 A | 8/1951 |
| WO | 200177739 | 10/2001 |
| WO | 2004107024 | 12/2004 |

OTHER PUBLICATIONS

"Wavefront-Guided Scleral Lens Prosthetic Device for Keratoconus", Sabesan et al, Optometry and Vision Science, vol. 90, No. 4, pp. 314-323, 2013.

Office action dated Mar. 14, 2016 regarding U.S. Appl. No. 14/032,920, 6 pages.

Notice of Allowance dated Jun. 22, 2016 regarding U.S. Appl. No. 14/032,920, 5 pages.

* cited by examiner

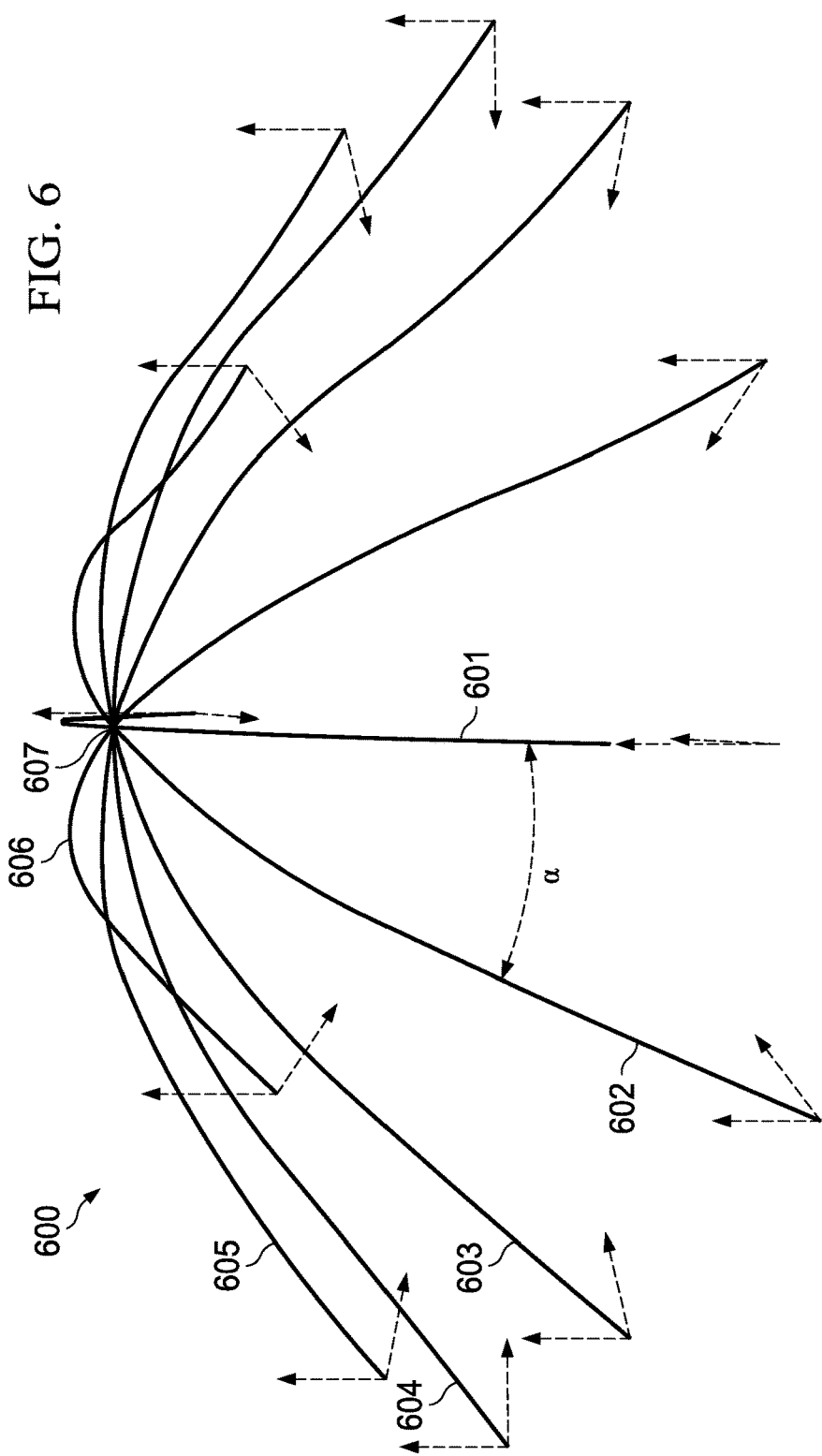

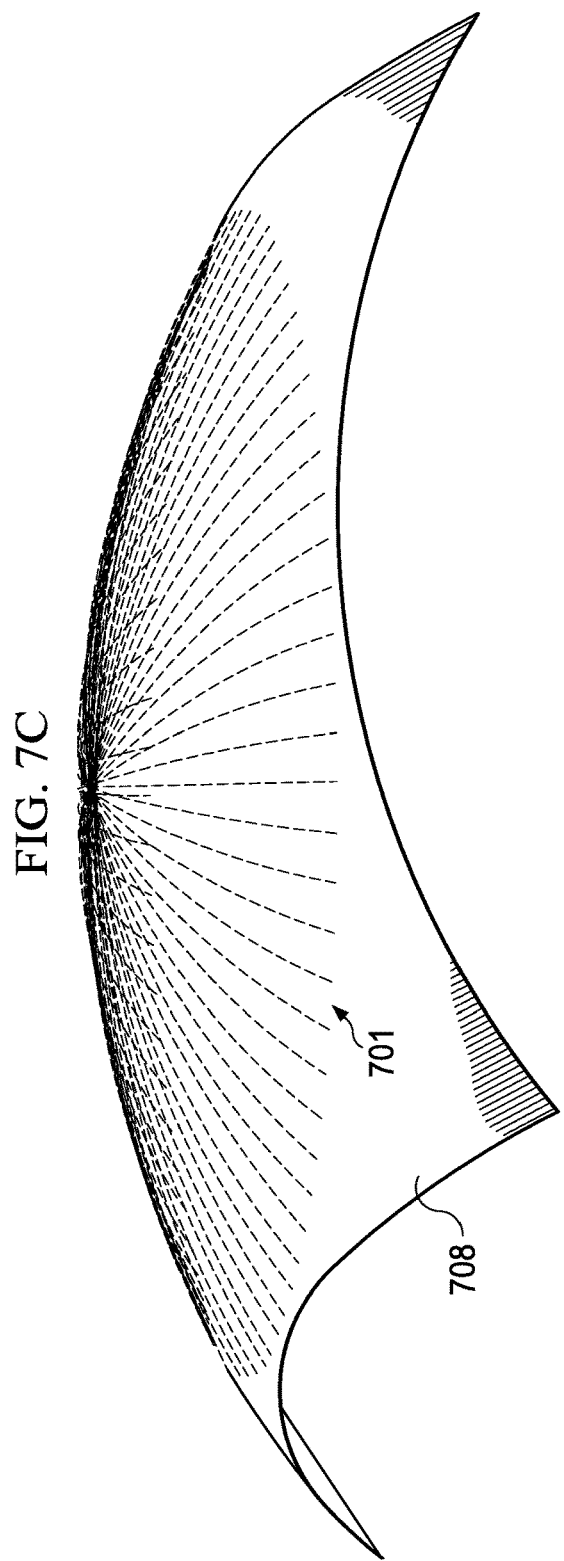

SYSTEM AND METHOD FOR DESIGNING SCLERAL LENSES

This application is a continuation application of U.S. patent application Ser. No. 14/032,920, filed Sep. 20, 2013.

FIELD OF THE INVENTION

The present invention relates to optical systems. In particular, the present invention relates to systems and methods for designing scleral lenses.

BACKGROUND OF THE INVENTION

Keratoconus is a degenerative disorder of the eye in which structural changes within the cornea cause thinning and loss of curvature. Keratoconus can cause substantial distortion of vision, including double vision (diplopia), streaking and hyper-sensitivity to light. Keratoconus is typically diagnosed during adolescence. Debilitating deterioration in vision can occur.

Refractive surgical procedures, such as Laser-Assisted Keratomileusis ("LASIK"), are often prescribed to correct common vision disorders. In general, the LASIK procedure is performed by making a thin flap of corneal tissue, folding the flap out of the way, altering the shape of the cornea by subtracting tissue using an excimer laser, then replacing the flap.

Despite the many advantages of LASIK, severe side effects can occur. For example, halos, starbursts, loss of low-light sensitivity and dryness are common side effects of the procedure. In other less common side effects, the flap may fail to adhere properly to the eye's surface or may cause microscopic wrinkles in the flap called corneal striae. Studies indicate that flap complications occur in from 0.3 to 5.7 percent of LASIK procedures, according to the April 2006 issue of *American Journal of Ophthalmology*. These flap complications can lead to an irregularly shaped eye surface and distorted vision.

Irregular astigmatism also may occur from LASIK correction that is not centered properly on the eye or from irregular healing after the procedure.

In another side effect, epithelial ingrowth occurs when cells from the outer layer of the cornea, the epithelium, grow under the flap. In some cases, blurred vision and or chronic discomfort can result.

In yet another side effect, diffuse lamellar keratitis ("DLK"), nicknamed "Sands of the Sahara," results in which an inflammation under the LASIK flap occurs. But if the inflammation is uncontrolled, as in DLK, it can interfere with healing and cause vision loss.

The prior art has provided different methods to compensate for the side effects of LASIK surgery; however, none is completely satisfactory. For example, corneal implants, called "Intacs," may be prescribed to hold the cornea in place.

Another remedy for LASIK side effects is gas permeable contact lenses, such as scleral lenses, which are prescribed as a cost effective and safe remedy. However, the prior art methods to design and construct sclera lenses, so far, have been ineffective to produce an adequate "fit" at an economical price, so that the remedy cannot be widely prescribed or used.

For example, U.S. Pat. No. 5,570,142 to Lieberman discloses a contact lens for asymmetric aspheric corneas with a peripheral portion to fit peripheral portion of the cornea as determined by scan of subject eye. The contact lens is not substantially greater in diameter than the cornea. The process for manufacturing the lens uses three-dimensional topographic data from points on the cornea. The data is used to shape at least the peripheral portion of the posterior surface of the lens. However, the process in Lieberman limited to corneal lenses only and not suitable for scleral lenses.

U.S. Pat. No. 5,452,031 to Ducharme discloses a method for manufacturing a contact lens. The contact lens is made through use of a computer implementing an approximation of the cornea. Piecewise polynomials approximating the corneal topology have equal first and second derivatives where they join. A polynomial representing the central optical portion of the lens and the piecewise polynomial adjacent to the central optical portion curve have an equal first derivative where they join. A contact lens is cut corresponding to the lens surface defined by the piecewise polynomials. However, the method in Ducharme requires an approximation of only the cornea thereby leading to an inaccurate representation of the scleral surface and an uncomfortable fit.

The prior art fails to disclose or suggest a system and method for designing scleral lenses that conform to the shape of the eye surface. Therefore, there is a need in the art for a system and method for designing scleral lenses that accurately follows the shape of the eye surface such that the lens does not rotate when worn or move excessively, and can be worn comfortably and safely on the eye.

SUMMARY

In a preferred embodiment, a system and method for designing scleral lenses is disclosed. The system includes a computer, a camera, and a lathe connected by a network.

In a preferred embodiment, the camera captures a set of sagittal images at each of a set of sagittal planes of an eye and sends the set of sagittal images to the computer. A combined sagittal image is created at each sagittal plane from each set of sagittal images. A spline curve is defined for each combined sagittal image to create a set of spline curves. A set of back surface curves is created from the set of spline curves. A back optical surface is generated. A back haptic surface curve is created for each back surface curve creating a set of back haptic surface curves. A back haptic surface is generated from the set of back haptic surface curves. A blend surface is generated to connect the back haptic surface to the back optical surface to create the back lens surface. The process is repeated to create the front lens surface.

A font surface curve is created at each plane adjacent to the back surface to create a set of front surface curves. A front optical surface is generated. A front haptic surface curve is created for each front surface curve creating a set of front haptic surface curves. A front haptic surface is generated from the set of front haptic surface curves. A blend surface is generated to connect the front haptic surface to the front optical surface to create the front lens surface.

A "point cloud" is generated from the back lens surface and the front lens surface. The point cloud is converted to a lens image. The lens is converted to a text file. The text file is sent to the lathe and a scleral lens is cut by the lathe using the text file.

BRIEF DESCRIPTION OF THE DRAWINGS

The disclosed embodiments will be described with reference to the accompanying drawings.

FIG. 6 is a set of near point curves of a preferred embodiment.

FIG. 7C is a point cloud of an optical section and an optical surface of a preferred embodiment.

DETAILED DESCRIPTION

Figure 1:
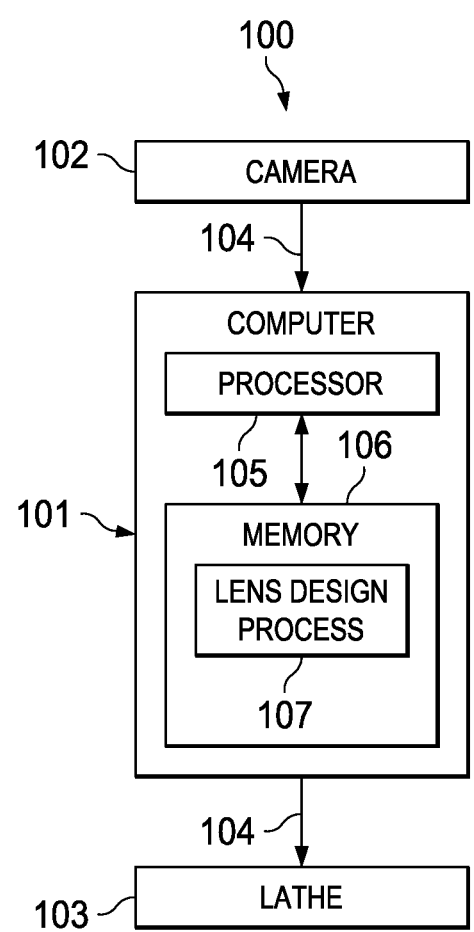
FIG. 1 is a schematic for a system for designing a scleral lens of a preferred embodiment.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, or other modern and commercially available programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, system 100 includes computer 101, camera 102, and lathe 103, each connected to network 104. Computer 101 includes processor 105 and memory 106 connected to processor 105. Lens design process 107 is saved in memory 106 and executed by processor 105.

In use, camera 102 captures a set of sagittal images of an eye. The set of sagittal images are sent to computer 101 through network 104. A lens is designed using lens design process 107 from the set of sagittal images, as will be further described below. The lens design is sent to lathe 103 through network 104. Lathe 103 cuts the lens according to the design.

In a preferred embodiment, camera 102 is a Visante® optical coherence topography ("OCT") unit available from Carl Zeiss Meditec, Inc. Other suitable imaging devices known in the art may be employed.

In a preferred embodiment, lathe 103 is a DAC ALM lens lathe available from DAC International, Inc. Other suitable lens lathes known in the art may be employed.

Figure 2:
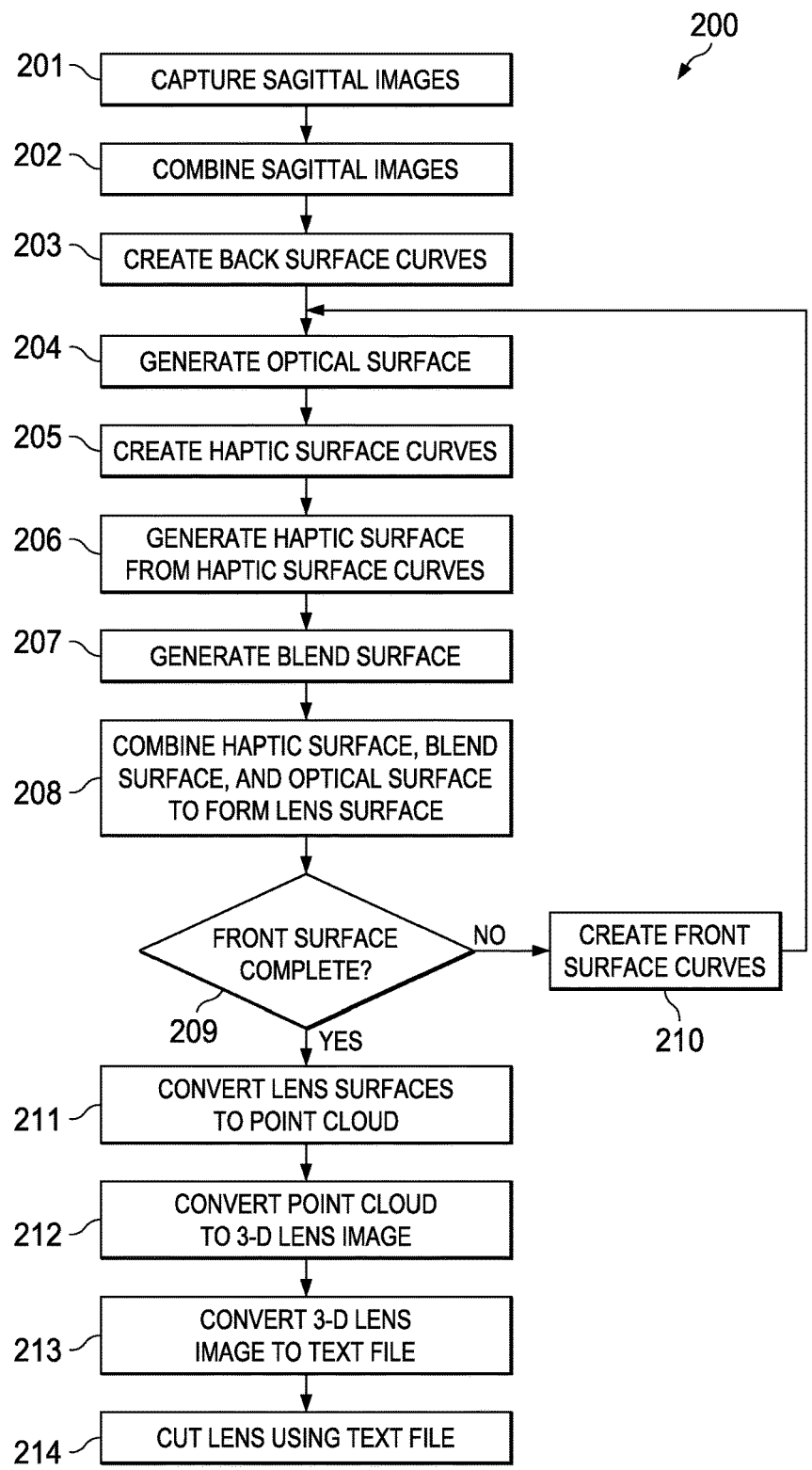
FIG. 2 is a flowchart of a method for designing a scleral lens of a preferred embodiment.

Referring to FIG. 2, lens design process 200 will be described.

In a preferred embodiment, a back lens surface is first created that will rest on an eye. In this embodiment, a front lens surface is created second, based on the back lens surface, as will be further described below.

In step 201, a set of overlapping sagittal images is captured at each of a set of sagittal planes of an eye.

In step 202, each set of sagittal images are combined to create a combined sagittal image for each sagittal plane.

In a preferred embodiment, each set of sagittal images are digitally "stitched" together using a graphics editing software program to create the combined sagittal image, as will be further described below.

In another embodiment, portions of each set of sagittal images are cut and pasted together using a graphics editing software program to create the combined sagittal image. Other image editing techniques known in the art may be employed.

In step 203, a set of back surface curves are created. A spline curve is defined on each combined sagittal image by tracing the surface of the eye to create a set of spline curves, as will be further described below. A lens curve is also generated for each combined sagittal image by converting each spline curve to a near point curve at a predetermined distance from the eye surface, as will be further described below.

In step 204, an optical surface is generated.

In step 205, a haptic surface curve is created for each lens curve to create a set of haptic surface curves.

In step 206, a haptic surface is generated from the set of haptic surface curves.

In step 207, a blend surface is generated for the optical surface and the haptic surface.

In step 208, the haptic surface, the blend surface, and the optical surface are combined to form a lens surface.

In step 209, if the front surface has been created, then lens design process 200 proceeds to step 211. If the front surface has not been created, then lens design process 200 proceeds to step 210.

In step 210, a set of front surface curves are created. In this embodiment, a front lens curve is generated at each sagittal plane by creating a near point curve at a predetermined distance from the back lens surface, as will be further described below.

Steps 204, 205, 206, 207, and 208 are repeated to create the front lens surface from the set of front surface curves.

In step 211, the back lens surface and front lens surface are converted to a point cloud.

In step 212, the point cloud is converted to a three-dimensional lens image.

In step 213, the three-dimensional lens image is converted to a text file. In step 214, the lens is cut by a lathe using the text file. In this step, the text file is a cutting pattern of the lens that guides the movement of the lathe.

Figure 3A:
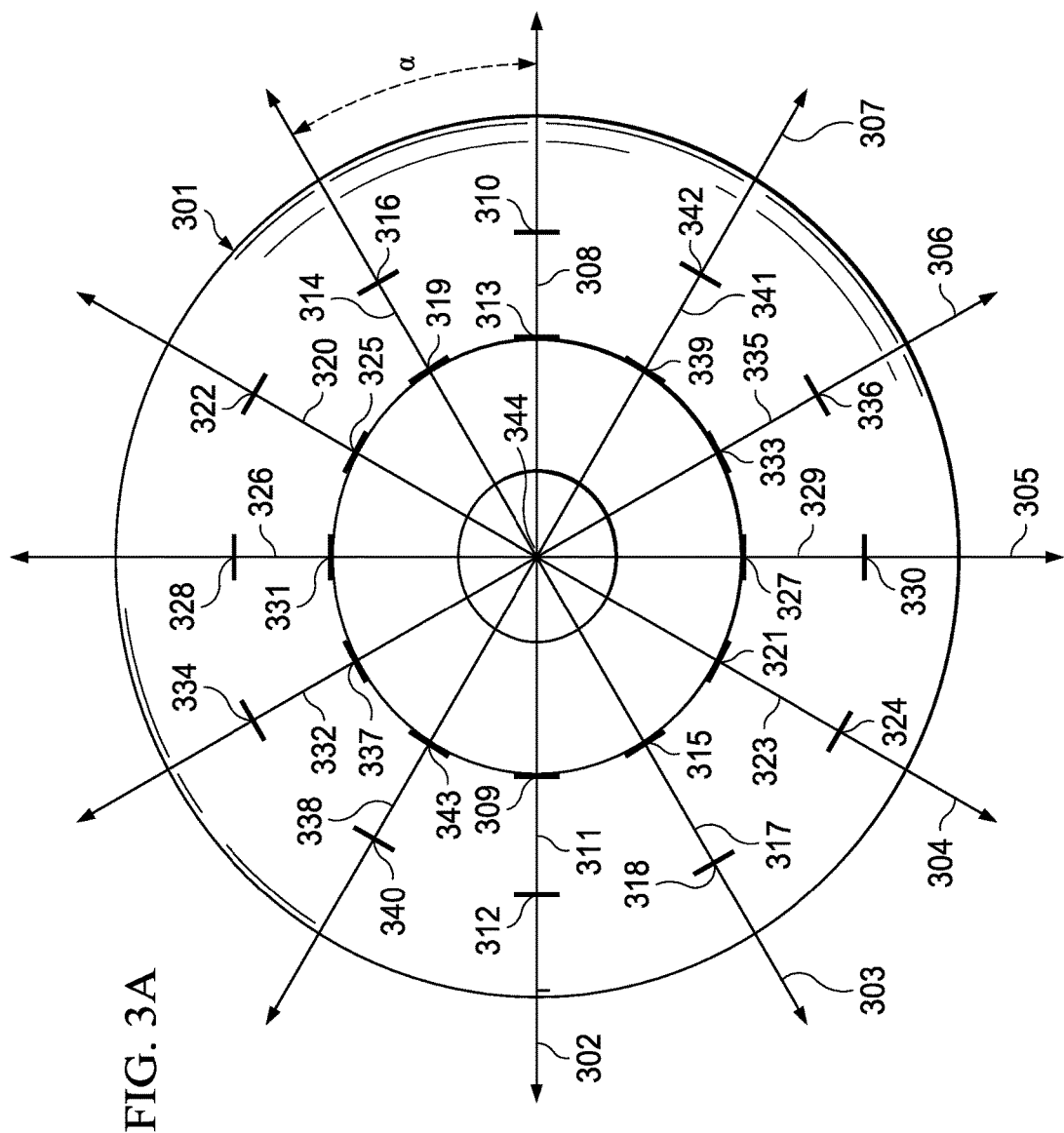
FIG. 3A is a set of sagittal planes of an eye of a preferred embodiment.

Referring to FIG. 3A, step 201 will be further described. Eye 301 has sagittal planes 302, 303, 304, 305, 306, and 307, and reference point 344. Angle α separates each of sagittal planes 302, 303, 304, 305, 306, and 307.

In the preferred embodiment, six planes are employed. In other embodiments, other numbers of planes may be employed.

In a preferred embodiment, angle α is approximately 30°. In other embodiments, other angles may be used.

A set of sagittal images is captured at each of sagittal planes 302, 303, 304, 305, 306, and 307. At sagittal plane 302, sagittal image 308 is captured from point 309 to point 310 and sagittal image 311 is captured from point 312 to point 313. At sagittal plane 303, sagittal image 314 is captured from point 315 to point 316 and sagittal image 317 is captured from point 318 to point 319. At sagittal plane 304, sagittal image 320 is captured from point 321 to point 322 and sagittal image 323 is captured from point 324 to point 325. At sagittal plane 305, sagittal image 326 is captured from point 327 to point 328 and sagittal image 329 is captured from point 330 to point 331. At sagittal plane 306, sagittal image 332 is captured from point 333 to point 334 and sagittal image 335 is captured from point 336 to point 337. At sagittal plane 307, sagittal image 338 is captured from point 339 to point 340 and sagittal image 341 is captured from point 342 to point 343.

In a preferred embodiment, two overlapping sagittal images are captured at each sagittal plane. In this embodiment, the pupil of the subject eye is dilated. A low power infrared light beam is centered on the dilated pupil to create the reference point. The eye is moved laterally to move the infrared radiation beam off-center to capture the two overlapping sagittal images. Other techniques known in the art may be employed.

Figure 3B:
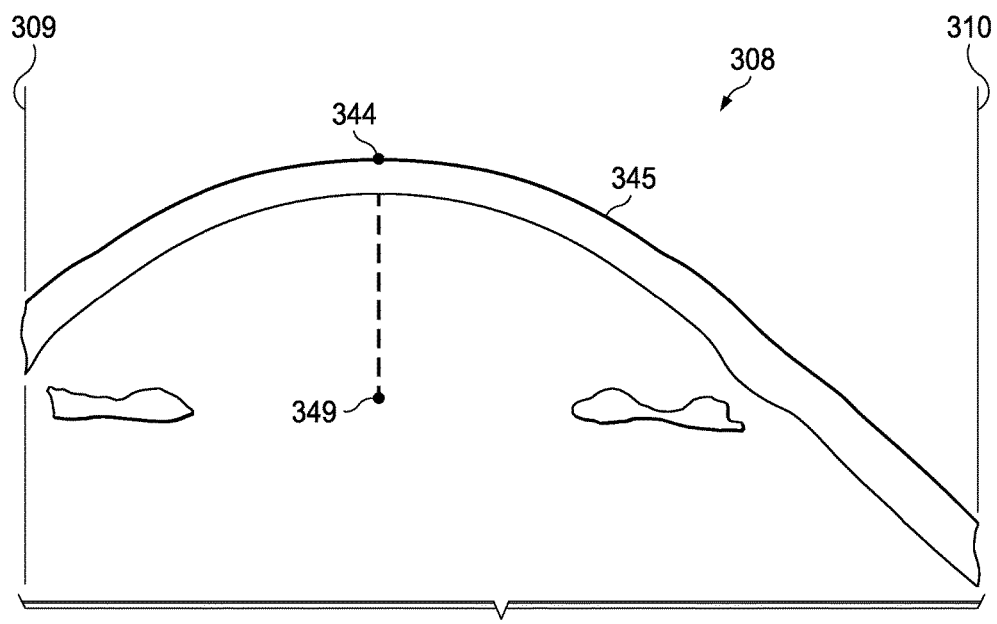
FIG. 3B is a sagittal image captured on a sagittal plane of a preferred embodiment.
Figure 3C:
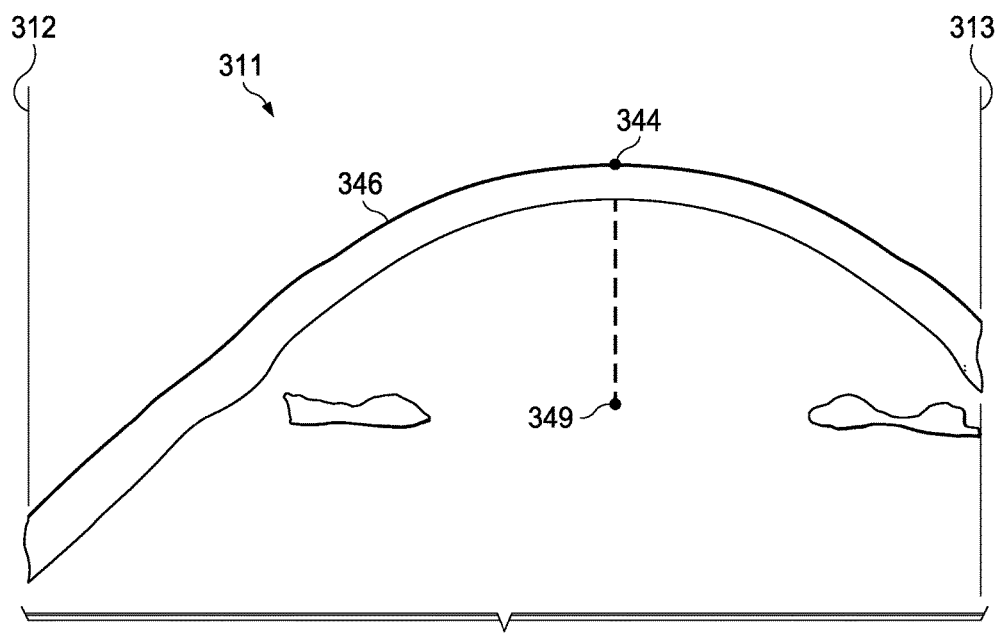
FIG. 3C is a sagittal image taken on a sagittal plane of a preferred embodiment.

Referring to FIGS. 3B and 3C by way of example, sagittal image 308 spans from point 309 to point 310. Sagittal image 308 has reference point 344, eye surface 345, and pupillary center 349. Sagittal image 311 spans from point 312 to point 313. Sagittal image 311 has reference point 344, eye surface 346, and pupillary center 349.

Figure 3D:
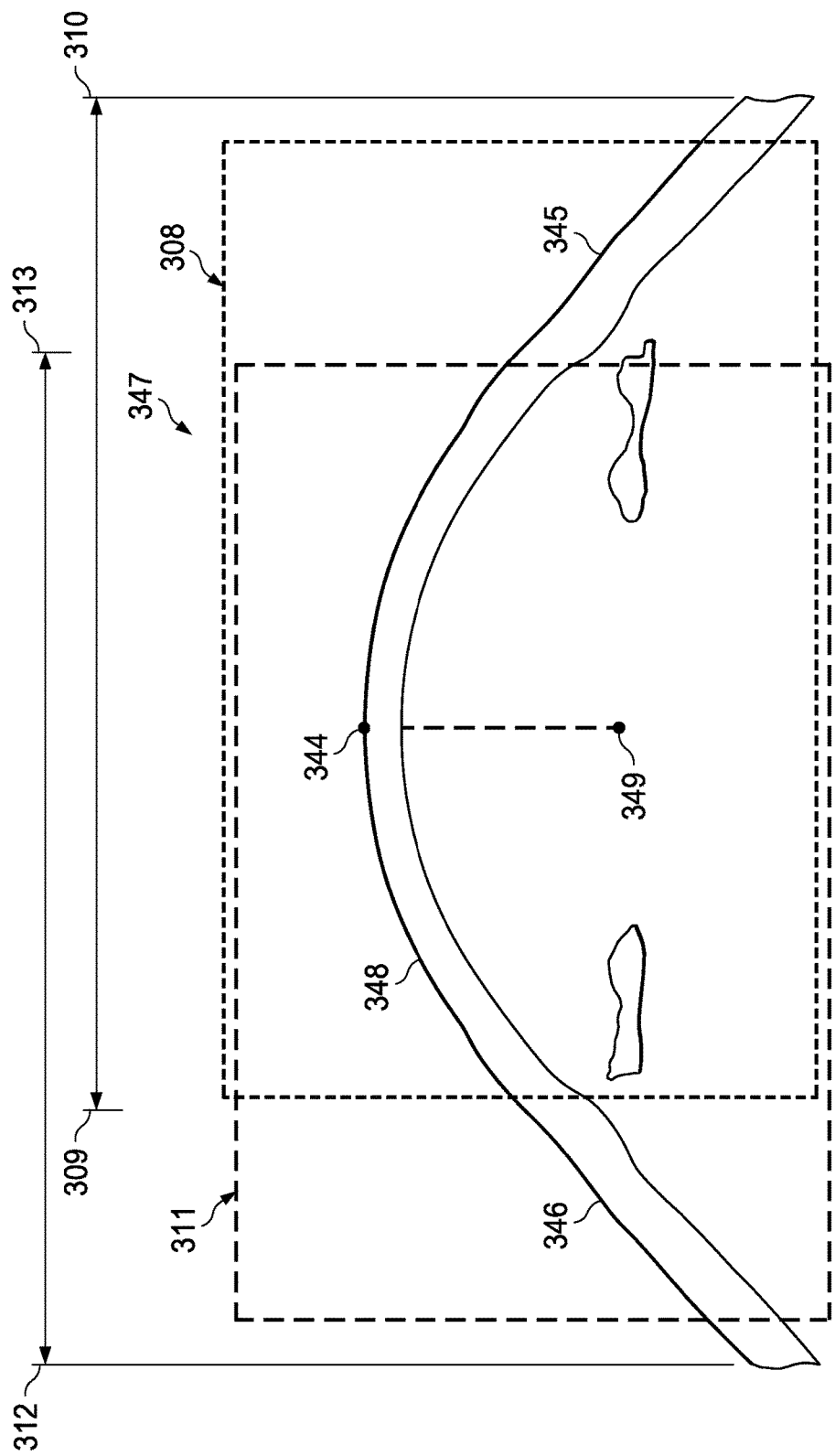
FIG. 3D is a combined sagittal image of a preferred embodiment.

Referring to FIG. 3D, step 202 will be further described. Combined sagittal image 347 includes sagittal image 308 and sagittal image 311. Sagittal image 308 has eye surface 345. Sagittal image 311 has eye surface 346. Combined sagittal image 345 has reference point 344, combined eye surface 348, and pupillary center 349. Eye surfaces 345 and 346 form combined eye surface 348.

In a preferred embodiment, each of eye surfaces 345 and 346 is a "surface profile" created by surface detection in the Visante® OCT unit when each of sagittal images 308 and 311 is captured.

In a preferred embodiment, sagittal image 308 and 311 are combined by overlapping eye surfaces 345 and 346 at pupillary center 349 to create a "best fit" combined eye surface. In this embodiment, sagittal images 308 and 311 are digitally "stitched" together using a graphics editing software.

In another embodiment, sagittal images 308 and 311 are combined by overlapping eye surfaces 345 and 346 and aligning eye surfaces 345 and 346 at reference point 344 to create a "best fit" combined eye surface.

In a preferred embodiment, combined sagittal image 347 is created by digitally "stitching" sagittal images 308 and 311 using Adobe Photoshop software available from Adobe Systems, Inc. In this embodiment, sagittal images 308 and 311 are imported into Adobe Photoshop and combined using the "Photomerge" tool in Adobe Photoshop. Other suitable image editing software known in the art may be employed.

In another embodiment, portions of sagittal images 308 and 311 are "cut" and "pasted" together, using Adobe Photoshop to create combined sagittal image 347. Other image editing software and techniques known in the art may be employed.

Figure 4:
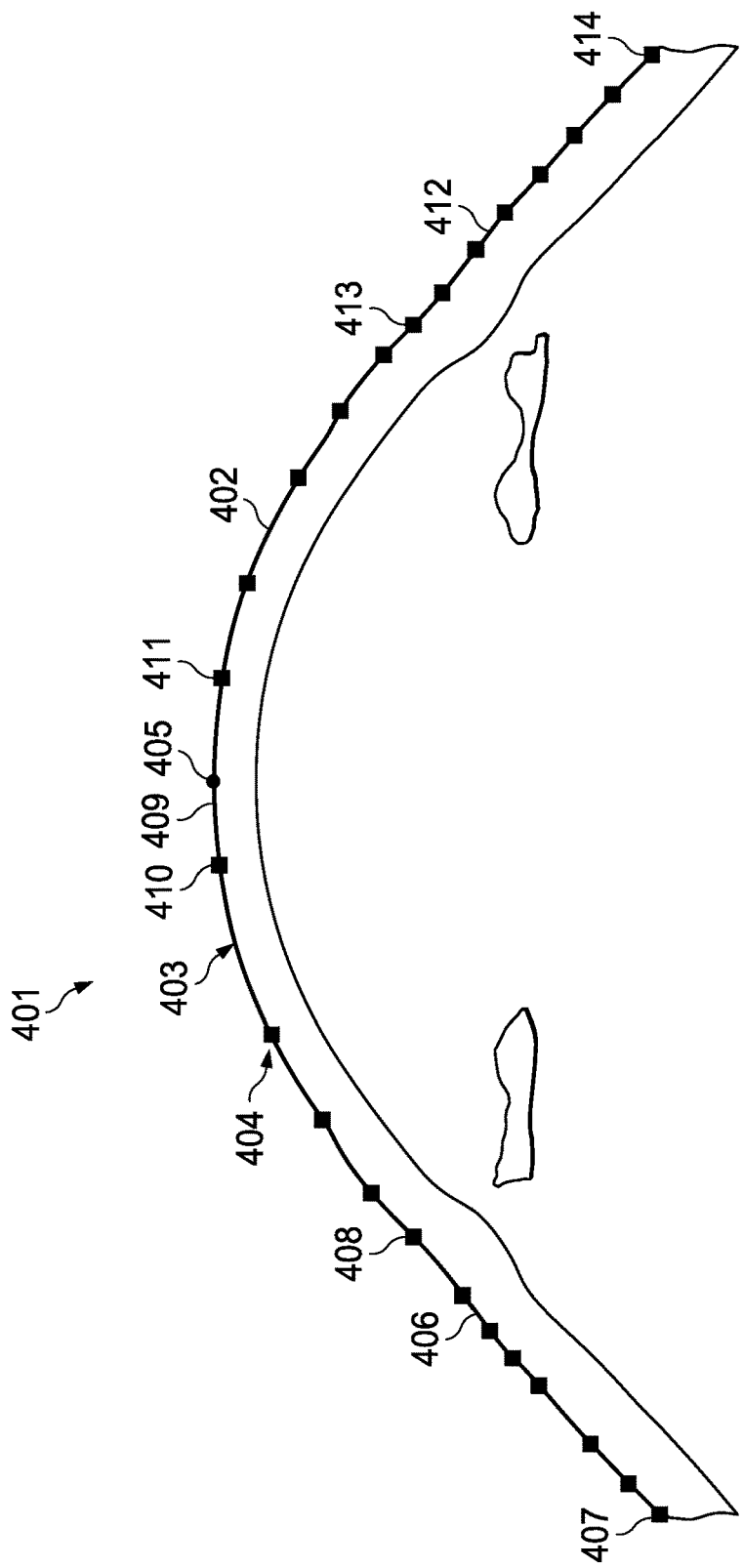
FIG. 4 is a spline curve on a corneal surface of a sagittal image of a preferred embodiment.

Referring to FIG. 4, step 203 will be further described. Combined sagittal image 401 includes eye surface 403. Eye surface 403 has surface apex 405. Spline curve 402 traces eye surface 403 and intersects surface apex 405. Spline curve 402 has a plurality of control points 404 to manipulate the curvature of spline curve 402.

In a preferred embodiment, spline curve 402 and control points 404 are created by importing combined sagittal image 401 into CATIA Design software, available from Dassault Systemes Americas Corp., and drawing spline curve 402 and control points on eye surface 403. Other computer-aided design ("CAD"), computer-aided manufacturing ("CAM") and/or computer-aided engineering ("CAE") software known in the art may be employed.

In a preferred embodiment, each of control points 404 is digitally "attached" to spline curve 402 at anatomical parts of eye surface 403. The density and location of each control points 404 depend on the curvature of eye surface 403. Any of control points 404 may be repositioned in any direction by selecting and dragging any of control points 404 to alter spline curve 402.

In a preferred embodiment, approximately 30 control points are attached to spline curve 402. In other embodiments, other numbers of control points are employed.

In a preferred embodiment, haptic section 406 is defined along spline curve 402 by end point 407 and point 408. Optical section 409 is defined along spline curve 402 by point 410 and point 411. Haptic section 412 is defined along spline curve 402 by point 413 and point 414.

Figure 5:
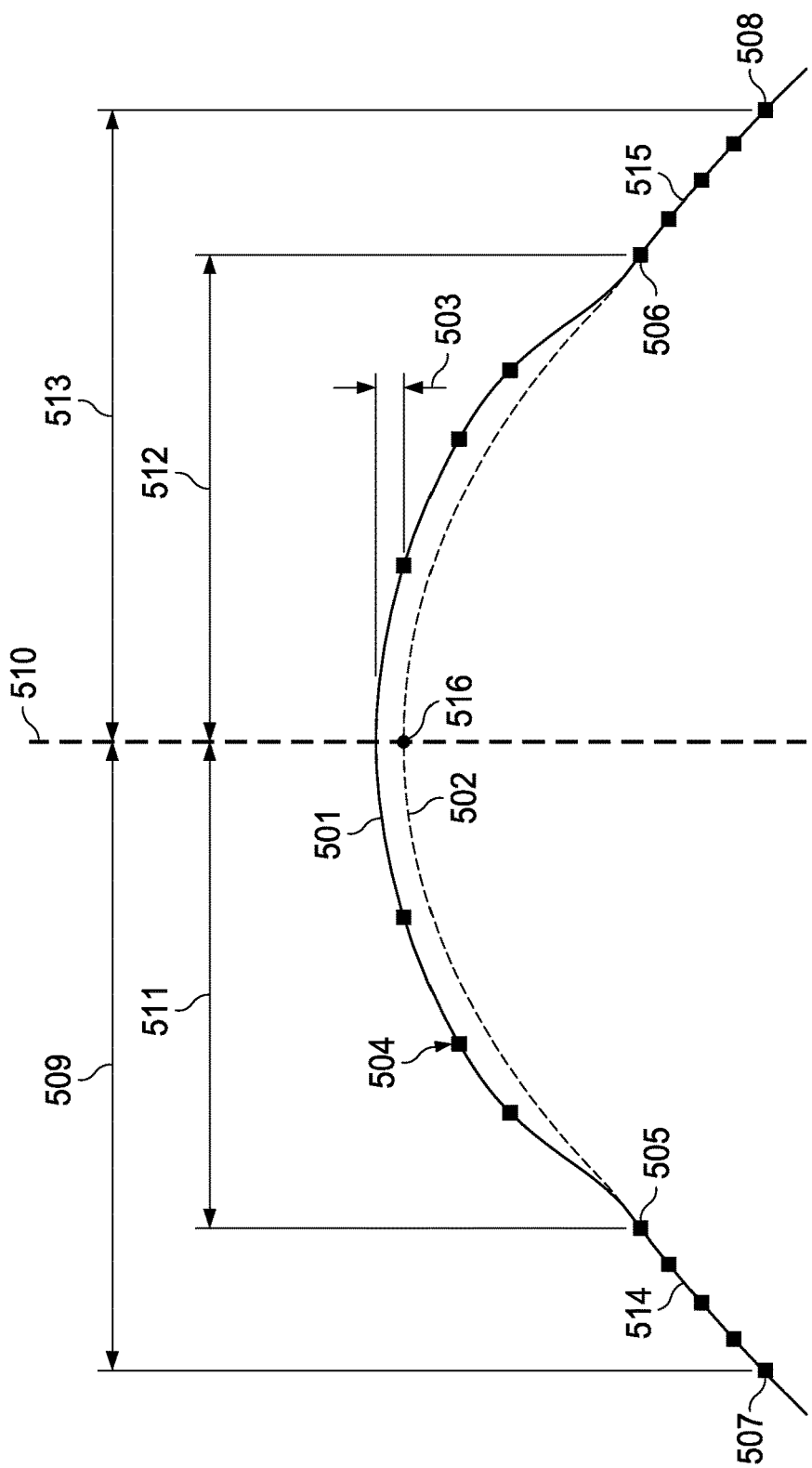
FIG. 5 is a near point curve on a sagittal image of a preferred embodiment.

Referring to FIG. 5, surface curve 501 is distance 503 from eye surface 502 at apex 516. Surface curve 501 has a plurality of control points 504 to manipulate the curvature and location of surface curve 501.

In a preferred embodiment, distance 503 is in a range from approximately 0.35 mm to approximately 0.5 mm to accommodate for a "settling distance" of the lens on the eye. In this embodiment, the settling distance is in a range of approximately 0.2 mm to 0.25 mm. In other embodiments, other distances are employed.

In a preferred embodiment, each of control points 504 is digitally "attached" to surface curve 501 at anatomical parts of eye surface 502. The density and location of each control points 504 depend on the curvature of eye surface 502. Any of control points 504 may be repositioned in any direction by selecting and dragging any of control points 504 to reposition surface curve 501.

In a preferred embodiment, surface curve 501 is created by selecting and dragging control points 504 to reposition a portion of spline curve 402 in FIG. 4 by a predetermined distance from eye surface 502.

Surface curve 501 contacts eye surface 502 at contact points 505 and 506. Surface curve 501 has end points 507 and 508. End point 507 is distance 509 from centerline 510.

Contact point 505 is distance 511 from centerline 510. Contact point 506 is distance 512 from centerline 510. End point 508 is distance 513 from centerline 510. Haptic section curve 514 of surface curve 501 is defined by end point 507 and contact point 505. Haptic section curve 515 of surface curve 501 is defined by end point 508 and contact point 506. Haptic section curves 514 and 515 contact eye surface 502.

In one embodiment, the distances of surface curve 501 are listed in Table 1 below. In other embodiments, other distances are employed according to the desired lens design.

TABLE 1

| Distance No. | Length |
| --- | --- |
| Distance 503 | 0.4 mm |
| Distance 509 | 9.5 mm |
| Distance 513 | 9.5 mm |
| Distance 511 | 7.25 mm |
| Distance 512 | 7.25 mm |

Referring to FIG. 6, set of surface curves 600 includes surface curves 601, 602, 603, 604, 605, and 606. Surface curves 601, 602, 603, 604, 605, and 606 are joined at apex 607. Each of surface curves 601, 602, 603, 604, 605, and 606 is separated from each other by angle α. Each of surface curves 601, 602, 603, 604, 605, and 606 extends along a sagittal plane as shown in FIG. 3A. Surface curve 601 extends along sagittal plane 305. Surface curve 602 extends along sagittal plane 304. Surface curve 603 extends along sagittal plane 303. Surface curve 604 extends along sagittal plane 302. Surface curve 605 extends along sagittal plane 307. Surface curve 606 extends along sagittal plane 306.

Step 204 will be further described with reference to FIGS. 7A, 7B, 7C, 7D, 8, and 9.

Figure 7A:
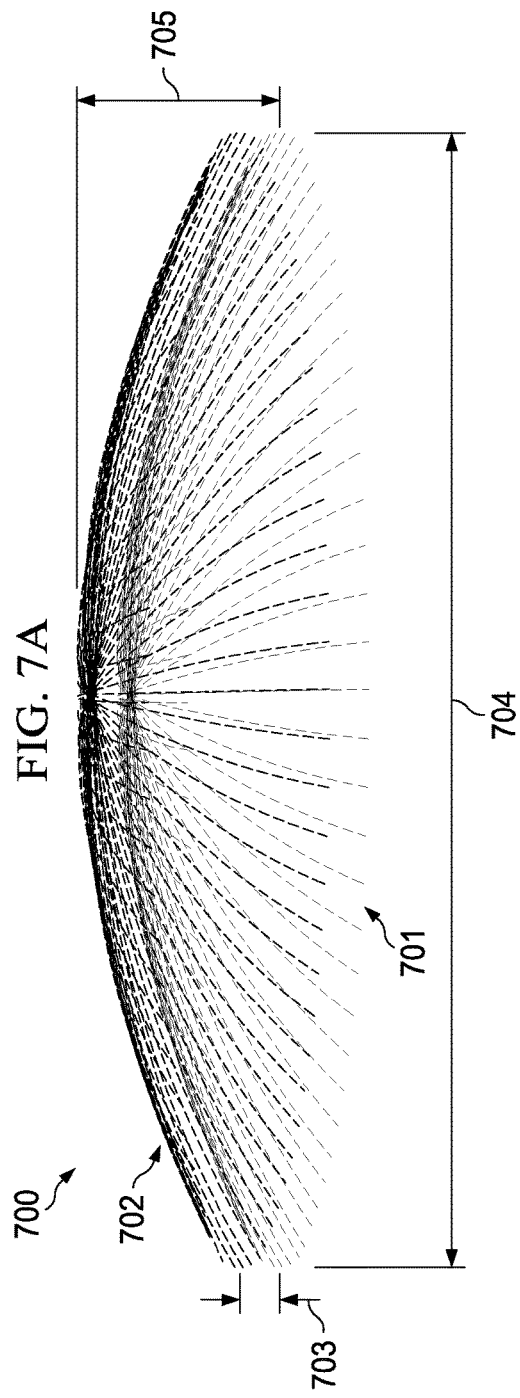
FIG. 7A is a point cloud of an optical section of a preferred embodiment.

Referring to FIG. 7A, optical point cloud 700 is imported from a spreadsheet of predetermined point values. Optical point cloud 700 is a set of three-dimensional coordinates. Optical point cloud 700 has set of back surface points 701 and set of front surface points 702, thickness 703, diameter 704, and height 705, each of which may vary according to the desired lens design. The predetermined point values are a set of polar coordinates generated from standard optical lens design methods known in the art that depend on the desired diameter, material, focal power, refractive index of the desired material, sagittal value of the curve of the desired material, and a minimum thickness of the desired material, and the general shape of the optical surfaces, i.e., spherical, aspherical, or toric. The curvature of set of front surface points 702 depends on the curvature of set of back surface points 701. For example, at a given diameter and a given set of back surface points the curve of the front optical surface will generally have a steeper curve as the focal power increases and a flatter curve as the focal power decreases.

In one embodiment, the predetermined point values of set of back surface points 701 are determined by the method disclosed in U.S. application Ser. No. 13/277,139, filed on Oct. 19, 2011 and is incorporated herein by reference.

In a preferred embodiment, set of back surface points 701 is imported first and set of front surface points 702 is imported second. In this embodiment, set of back surface points 701 is separated from optical point cloud 700 by determining a first set of surface coordinates that, when positioned on an eye, are closest to the pupillary center. In this embodiment, set of front surface points 702 is separated from optical point cloud 700 by determining a second set of surface coordinates that, when positioned on an eye, are furthest from the pupillary center.

Figure 7B:
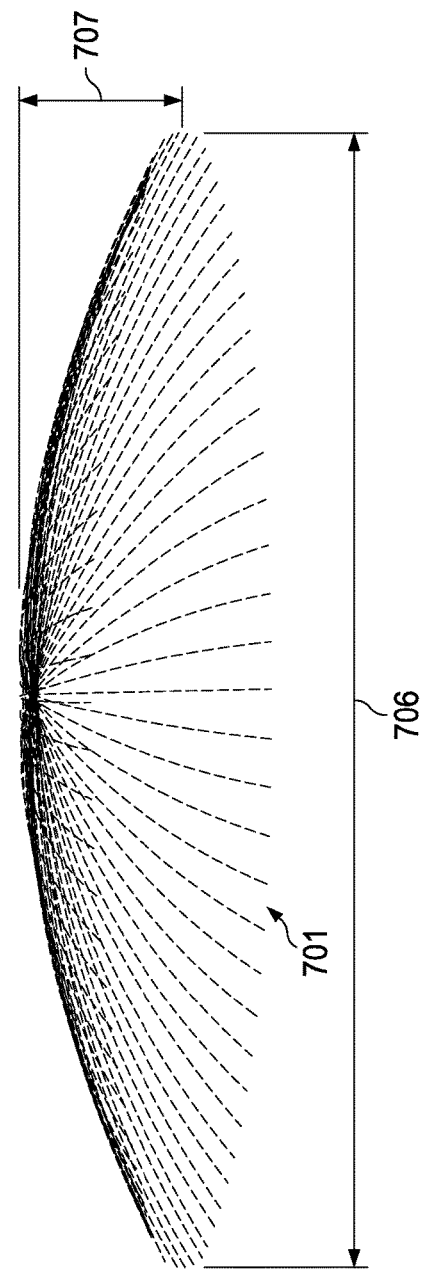
FIG. 7B is a set of back surface points of a preferred embodiment.

Referring to FIG. 7B by way of example, set of back surface points 701 is imported and separated from optical point cloud 700. Set of back surface points 701 has diameter 706 and height 707.

Referring to FIG. 7C by way of example, surface 708 is generated from set of back surface points 701 by connecting the point values of set of back surface points 701.

In a preferred embodiment, surface 708 is a best fit non-uniform rational B-spline ("NURBS") surface. In another embodiment, surface 708 is a t-spline surface. In another embodiment, surface 708 is a subdivision surface. Other surface models known in the art may be employed.

Figure 7D:
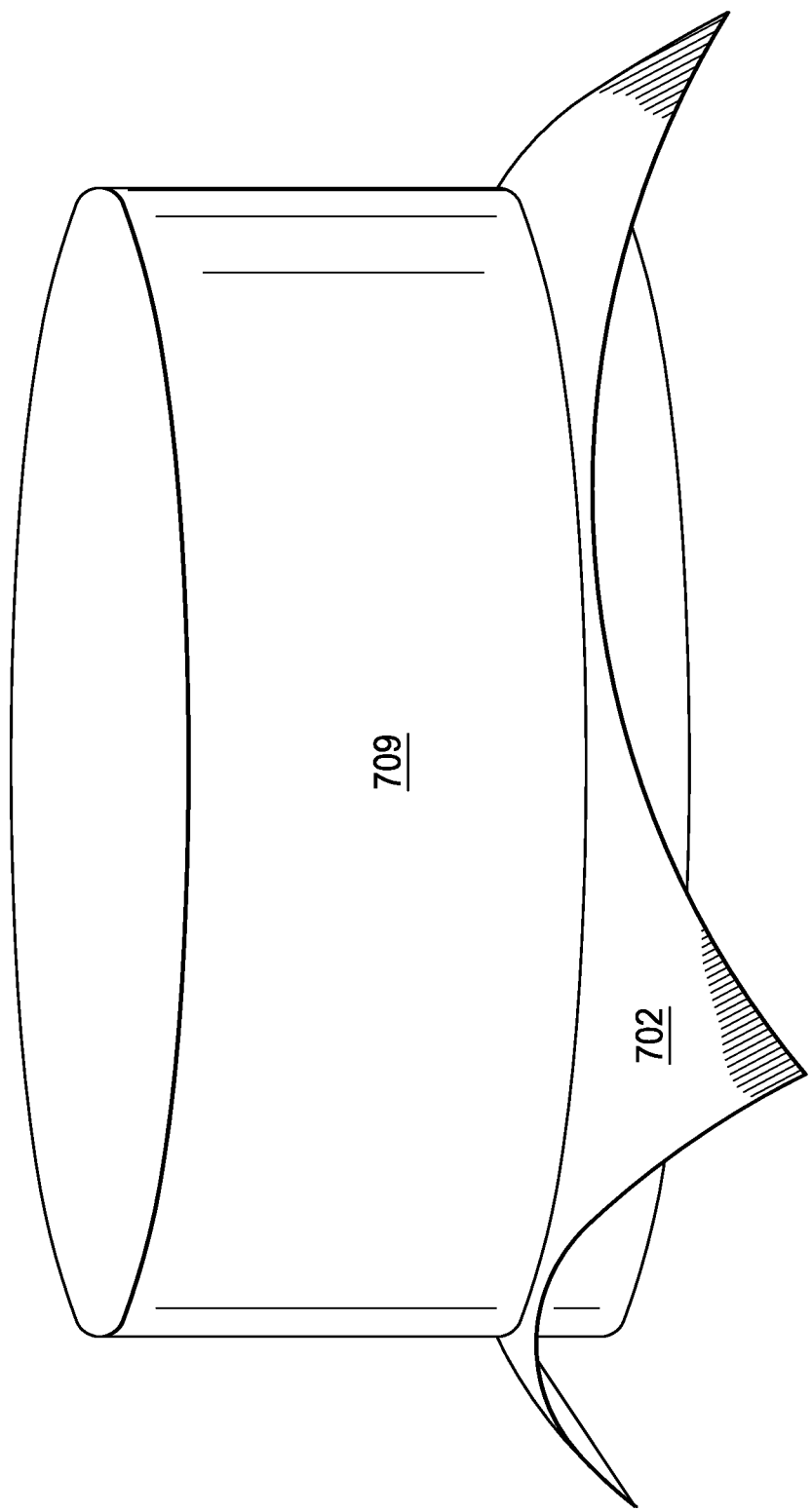
FIG. 7D is an optical surface and a trim tool of a preferred embodiment.
Figure 7E:
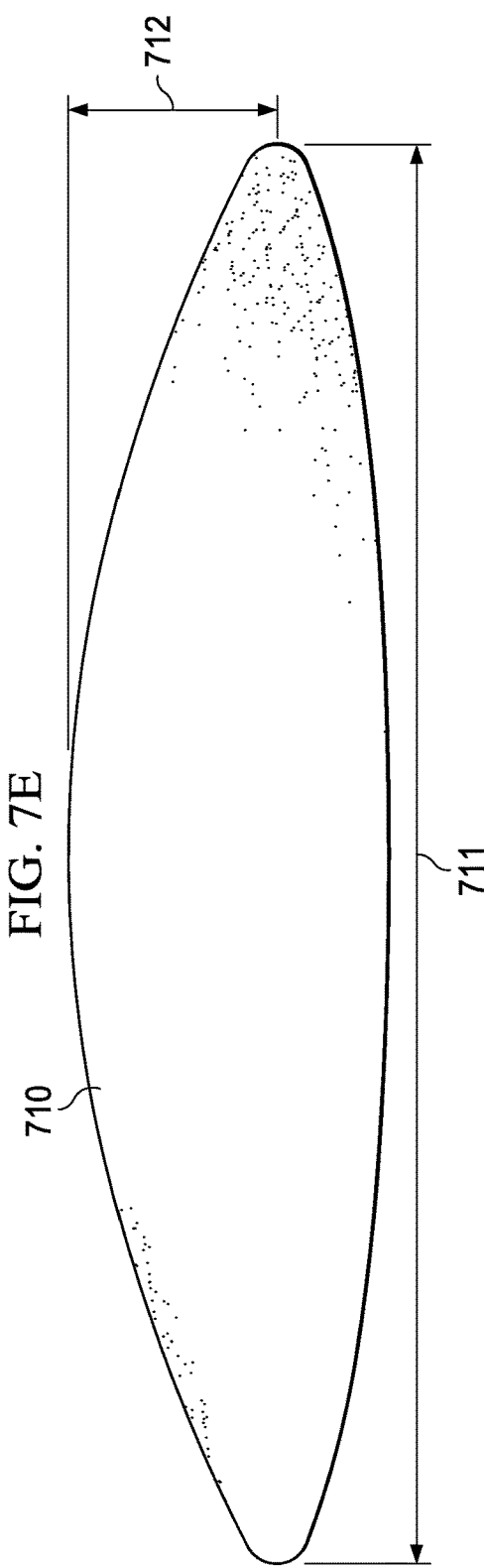
FIG. 7E is an optical surface of a preferred embodiment.

Referring to FIGS. 7D and 7E, corners of surface 708 are trimmed using trim tool 709 to create optical surface 710. Optical surface 710 has diameter 711 and height 712 that matches diameter 706 and height 707 of set of back surface points 701, respectively.

Figure 8:
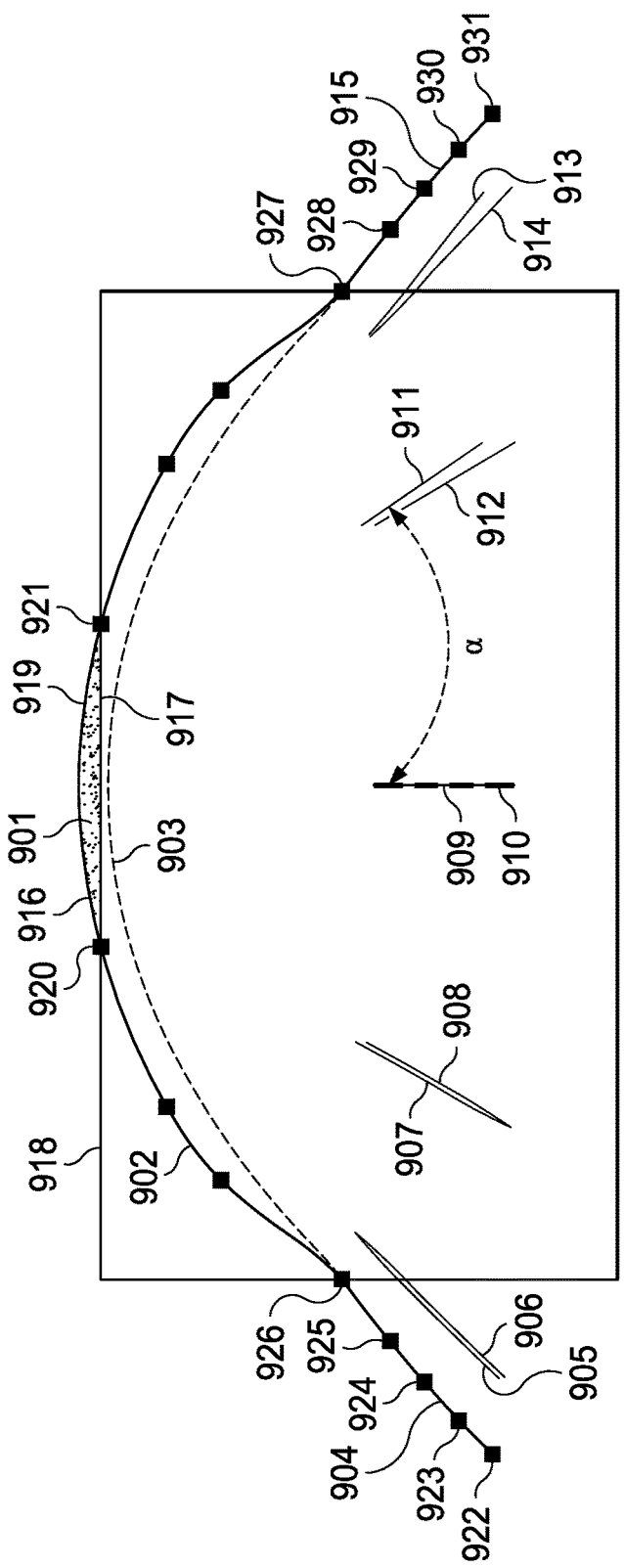
FIG. 8 is a drawing of an optical back surface trimmed to a near point curve of a preferred embodiment.

Referring to FIG. 8, steps 204 and 205 will be further described. Optical surface 901 has surface edge 916. Optical surface 901 is overlaid on surface curve 902 and eye surface 903. Surface edge 916 of optical surface 901 is aligned with surface curve 902 through control points 920 and 921 by selecting and dragging optical surface 901 to reposition optical surface 901. Surface curve 902 is further aligned with surface edge 916 of optical surface 901 at control points 920 and 921 by selecting and dragging control points 920 and 921 so that surface curve 902 is substantially tangential to surface edge 916 at control points 920 and 921. Optical surface 901 is trimmed with trim tool 918 to create surface edge 917 and define surface edge 916 from point 920 to point 921. Surface edge 917 is adjacent eye surface 903 and does not contact eye surface 903.

Surface curve 902 is trimmed with trim tool 918 by deleting portions of surface curve 902 covered by trim tool 918 to create haptic surface curves 904 and 915. Haptic surface curve 904 is defined from point 922 to point 926. Haptic surface curve 915 is defined from point 927 to point 931. Haptic surface curves 904 and 915 contact eye surface 903.

The slope of haptic surface curve 904 may be altered using points 922, 923, 924, 925, and 926 by selecting and dragging any of points 922, 923, 924, 925, and 926 to reposition haptic surface curve 904. The slope of haptic surface curve 915 may be altered using points 927, 928, 929, 930, and 931 by selecting and dragging any of points 927, 928, 929, 930, and 931 to reposition haptic surface curve 915. Altering the slopes of haptic surface curves 904 and 915 provides a better fit of haptic surface curves 904 and 915 on eye surface 903.

Each of haptic surface curves 905, 906, 907, 908, 909, 910, 911, 912, 913, and 914 is created as previously described. Each of haptic surface curves 904, 905, 906, 907, 908, 909, 910, 911, 912, 913, 914, and 915 extend along a sagittal plane as shown in FIG. 3A. Each of haptic surface curves 904, 905, 906, 907, 908, 909, 910, 911, 912, 913, 914, and 915 is separated from each other by angle α. Haptic surface curves 904 and 915 extend along sagittal plane 302. Haptic surface curves 905 and 914 extend along sagittal plane 303. Haptic surface curves 907 and 912 extend along sagittal plane 304. Haptic surface curves 909 and 910 extend along sagittal plane 305. Haptic surface curves 911 and 908 extend along sagittal plane 306. Haptic surface curves 913 and 906 extend along sagittal plane 307.

Figure 9:
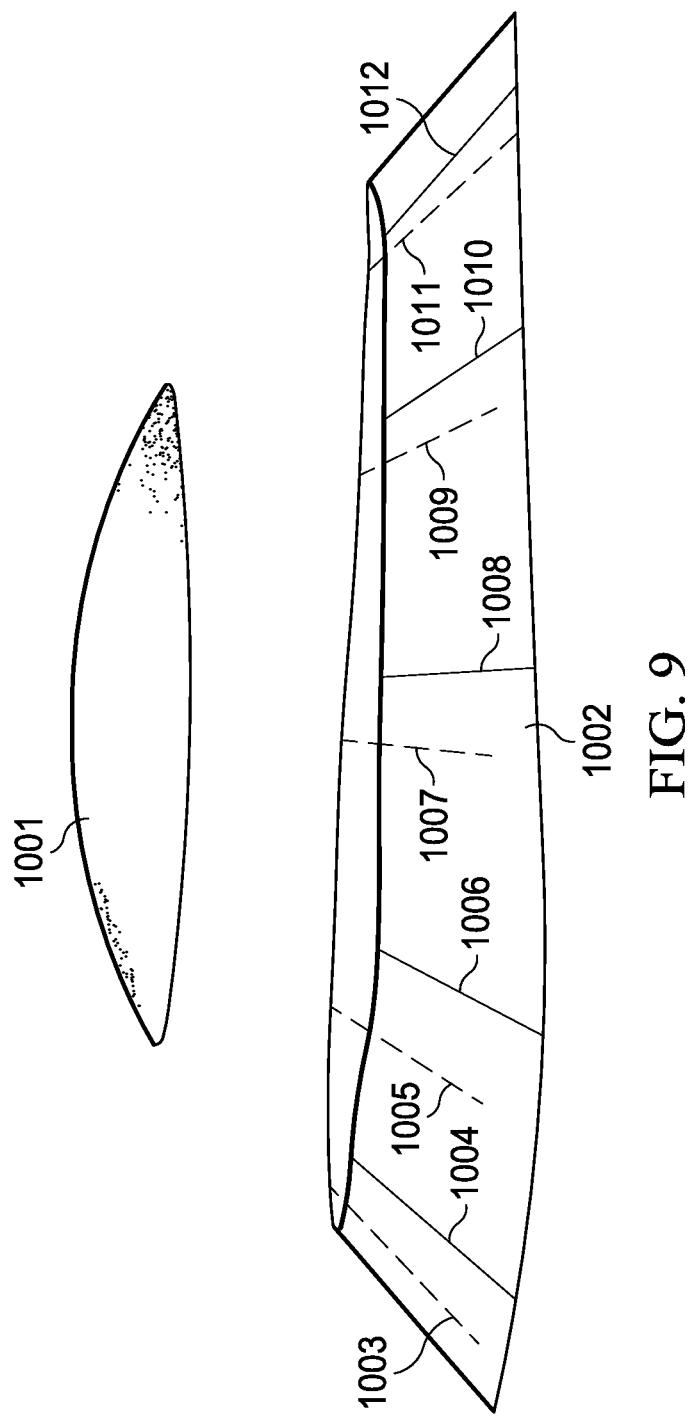
FIG. 9 is a drawing of an optical back surface section and a haptic surface section of a preferred embodiment.

Referring to FIG. 9 step 206 will be further described. Haptic surface 1002 is generated to connect haptic surface curves 1003, 1004, 1005, 1006, 1007, 1008, 1009, 1010, 1011, and 1012.

In a preferred embodiment, haptic surface 1002 is a best fit NURBS surface. In another embodiment, haptic surface 1002 is a t-spline surface. In another embodiment, haptic surface 1002 is a subdivision surface. Other surface models known in the art may be employed.

In a preferred embodiment, optical surface 1001 is a best fit NURBS surface. In another embodiment, optical surface 1001 is a t-spline surface. In another embodiment, optical surface 1001 is a subdivision surface. Other surface models known in the art may be employed.

Figure 10:
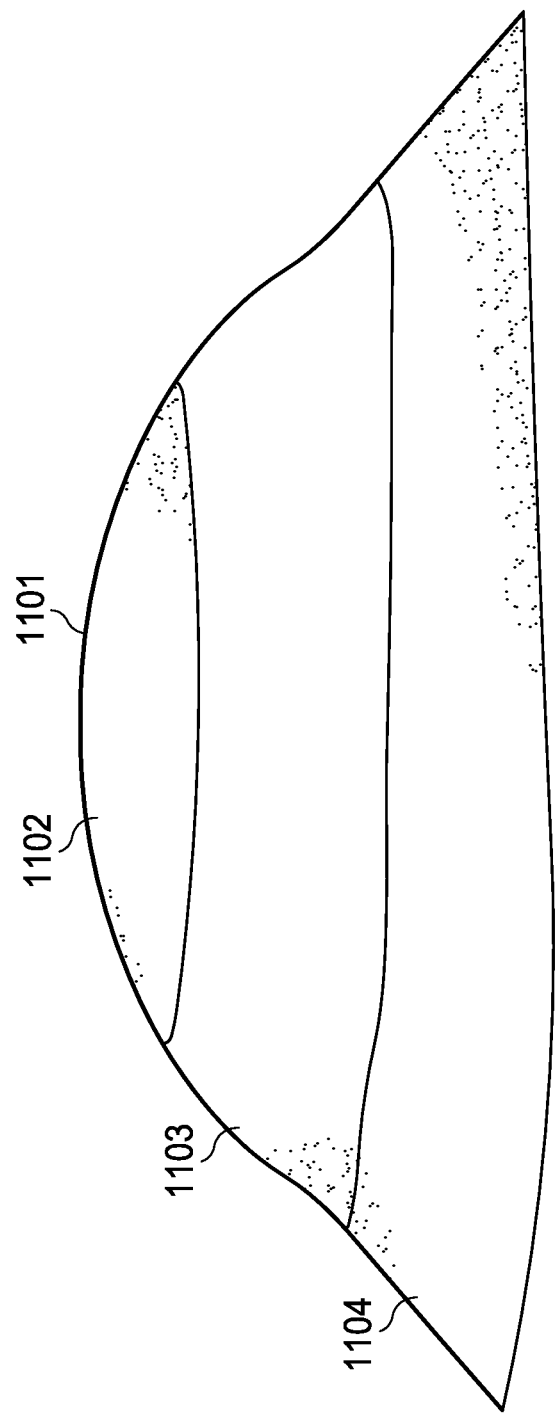
FIG. 10 is a drawing of a back surface of a lens of a preferred embodiment.

Referring to FIG. 10, steps 207 and 208 will be described in further detail. Blend surface 1103 is a best fit surface generated to connect optical surface 1102 with haptic surface 1104. Lens surface 1101 includes optical surface 1102, blend surface 1103 attached to optical surface 1102, and haptic surface 1104 attached to blend surface 1103.

In a preferred embodiment, blend surface 1103 is a best fit NURBS surface. In another embodiment, blend surface 1103 is a t-spline surface. In another embodiment, blend surface 1103 is a subdivision surface. Other surface models known in the art may be employed.

Figure 11:
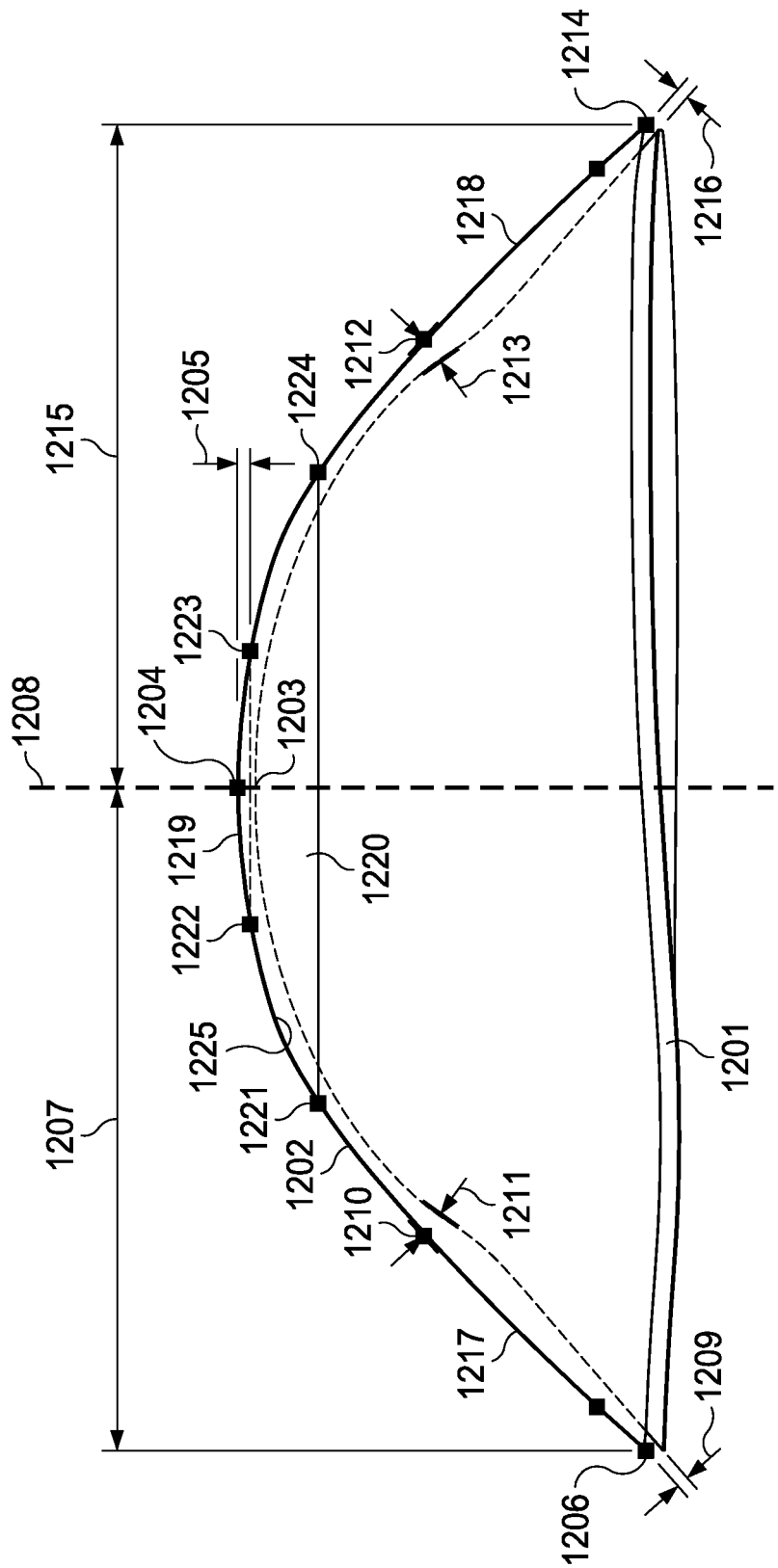
FIG. 11 is a drawing of a back surface of a lens, a spline of a front surface of a lens, and a front optical section of a preferred embodiment.

Referring to FIG. 11, step 210 will be further described. Each front surface curve 1202 is generated adjacent to back lens surface 1201 and extends along a sagittal plane as shown in FIG. 3A. By way of example, front surface curve 1202 extends along sagittal plane 302. Front surface curve 1202 is constrained by back lens surface 1201. Front surface curve 1202 has haptic surface curves 1217 and 1218. Front surface curve 1202 is trimmed as previously described to create haptic surface curves 1217 and 1218. Haptic surface curve 1217 is defined from end point 1206 to point 1210. Haptic surface curve 1218 is defined from point 1212 to end point 1214.

Front optical surface 1220 is overlaid onto front surface curve 1202. Edge 1225 of optical surface 1220 is aligned with front surface curve 1202 through points 1221, 1222, 1223, 1224, and 1204 by selecting and dragging front optical surface 1220 to align edge 1225 of optical surface 1220 with front surface curve 1202 as previously described. Optical surface 1220 is trimmed as previously described to define optical surface 1220 from point 1222 to point 1223.

Point 1204 is distance 1205 from back lens surface apex 1203. End point 1206 is distance 1207 from center line 1208 and distance 1209 from back lens surface 1201. Point 1210 is distance 1211 from back lens surface 1201. Point 1212 is distance 1213 from back lens surface 1201. End point 1214 is distance 1215 from center line 1208 and distance 1216 from back lens surface 1201.

Distance 1205 depends on the desired lens design. In a preferred embodiment, distance 1205 is in a range from 0.15 mm to 0.4 mm.

In one embodiment, the distances of front surface curve 1202 are listed in Table 2 below. In other embodiments, other distances are employed according to the desired lens design.

TABLE 2

| Distance No. | Length |
| --- | --- |
| Distance 1205 | 0.25 mm |
| Distance 1207 | 9.3 mm |
| Distance 1209 | 0.18 mm |
| Distance 1211 | 0.35 mm |
| Distance 1213 | 0.35 mm |
| Distance 1215 | 9.3 mm |
| Distance 1216 | 0.18 mm |

Figure 12:
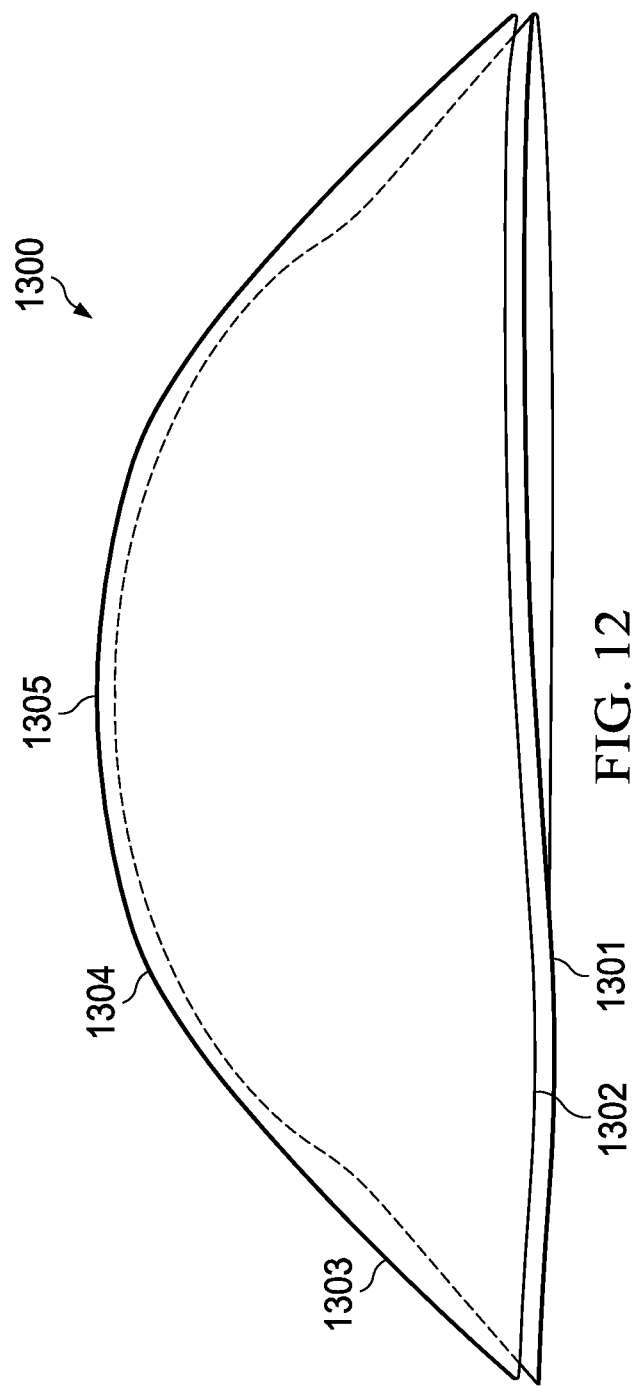
FIG. 12 is a drawing of a front surface and a back surface of a lens.

Referring to FIG. 12, lens 1300 includes back lens surface 1301 and front lens surface 1302 adjacent to back lens surface 1302. Front lens surface 1302 includes front haptic surface 1303, front blend surface 1304 attached to haptic surface 1303, and front optical surface 1305 attached to front blend surface 1304. Each of front haptic surface 1303, front blend surface 1304, and front optical section 1305 is generated as previously described with respect to the back surface.

In a preferred embodiment, front haptic surface 1303 is a best fit NURBS surface. In another embodiment, front haptic surface 1303 is a t-spline surface. In another embodiment, front haptic surface 1303 is a subdivision surface. Other surface models known in the art may be employed.

In a preferred embodiment, front blend surface 1304 is a best fit NURBS surface. In another embodiment, front blend surface 1304 is a t-spline surface. In another embodiment, front blend surface 1304 is a subdivision surface. Other surface models known in the art may be employed.

In a preferred embodiment, front optical surface 1305 is a best fit NURBS surface. In another embodiment, front optical surface 1305 is a t-spline surface. In another embodiment, front optical surface 1305 is a subdivision surface. Other surface models known in the art may be employed.

Figure 13:
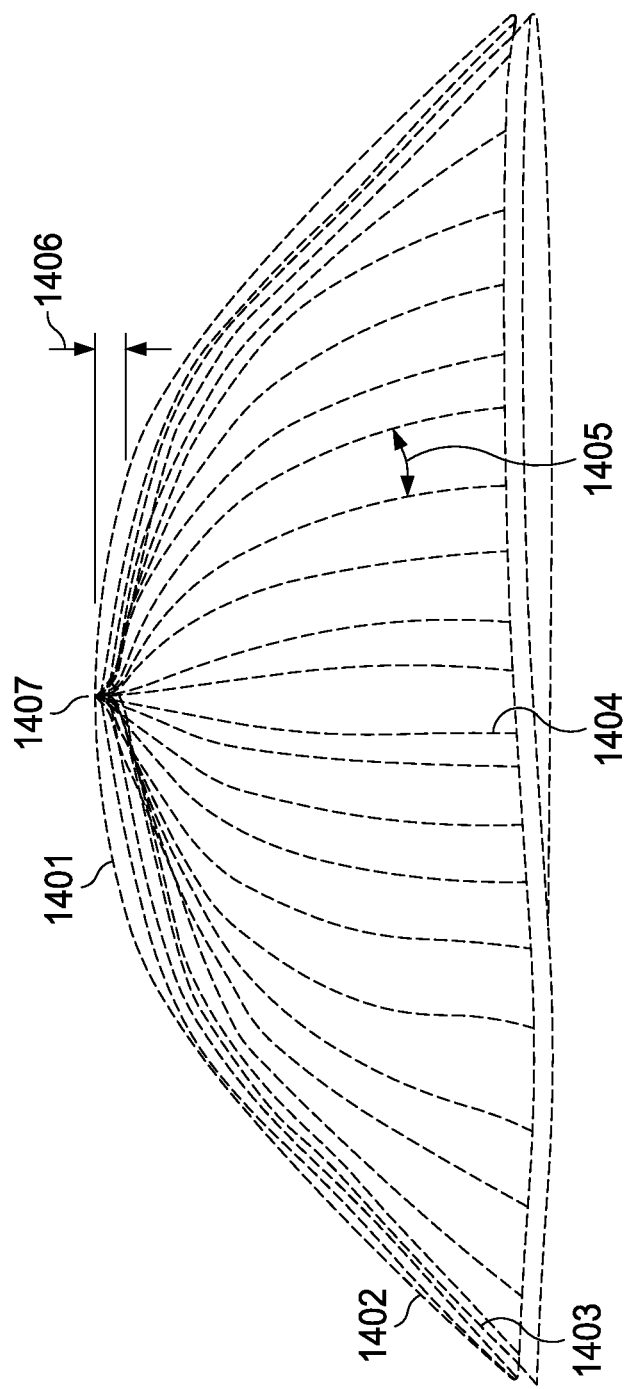
FIG. 13 is a drawing of a point cloud of a lens.

Referring to FIG. 13, step 211 will be further described. Point cloud 1401 includes front lens point cloud 1402 and back lens point cloud 1403. Front lens point cloud 1402 and back lens point cloud 1403 are separated by thickness 1406. Thickness 1406 varies depending on the shape of back lens point cloud 1403 and the desired lens design. Point cloud 1401 further includes point density 1404 and separation distance 1405. Point cloud 1401 is a collection of points. Each point is a three-dimensional coordinate to model a three-dimensional lens.

In a preferred embodiment, point density 1404 is approximately 0.1 mm other densities may be employed.

In a preferred embodiment, separation distance 1405 is approximately 0.3 mm. Other distances may be employed.

In one embodiment, thickness 1406 is approximately 0.25 mm at apex 1407. In other embodiments, thickness 1406 varies according the shape of back lens point cloud 1403 and the desired lens design.

Figure 14:
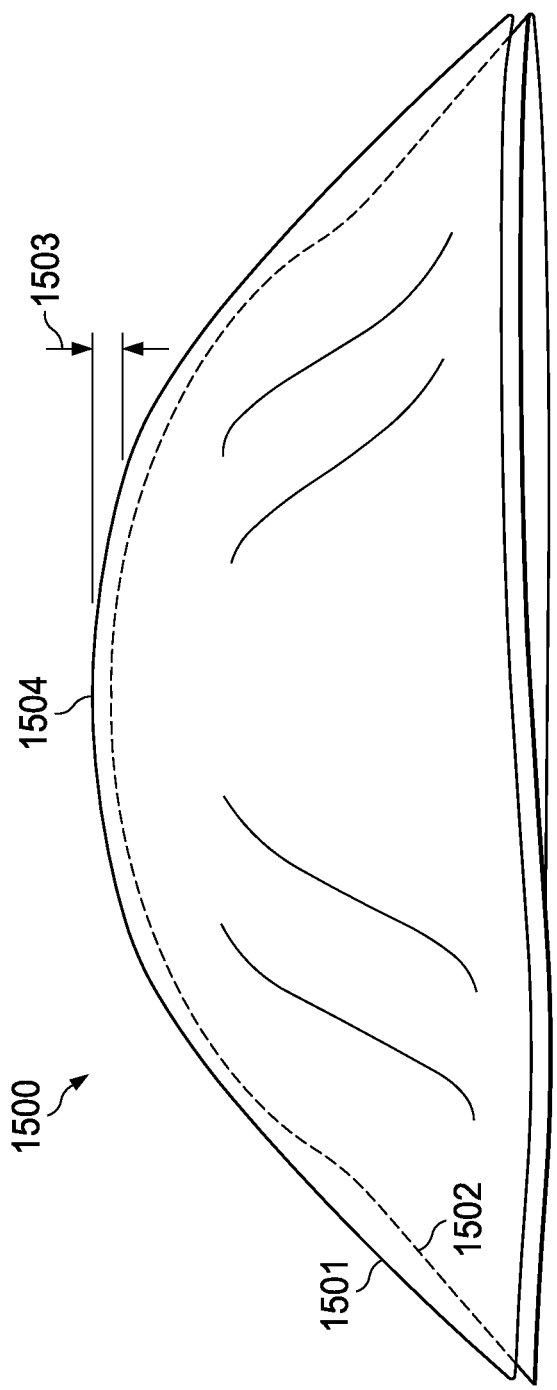
FIG. 14 is a drawing of a completed lens.

Referring to FIG. 14, step 212 will be described in further detail. Lens image 1500 has front lens surface image 1501, back lens surface image 1502, and lens thickness 1503. Lens thickness 1503 varies depending on the shape of back lens surface image 1502 and the desired lens design.

In one embodiment, lens thickness 1503 is approximately 0.25 mm at apex 1504.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A method implemented in a system comprising a computer connected to a camera and to a lathe, the method comprising:
   capturing, using the camera, a set of sagittal images of an eye of a patient;
   extracting, using the computer, a set of back surface curves from the set of sagittal images by creating a corresponding set of points for each sagittal image;
   combining, using the computer, all sets of points into a point cloud;
   creating, by the computer, a lens image from the point cloud; and
   cutting, using the lathe as instructed by the computer according to the lens image, a contact lens.

2. The method of claim 1 further comprising:
   generating a back lens surface from the set of back surface curves;
   creating a set of front surface curves from the back lens surface;
   generating a front lens surface from the set of front surface curves; and
   converting the lens image to a text file, wherein the computer uses the text file to issue instructions to the lathe.

3. The method of claim 2, wherein the step of generating a back lens surface from the set of back surface curves further comprises the steps of:
   generating a back optical surface;
   creating a back haptic surface curve for each back surface curve of the set of back surface curves to create a set of back haptic surface curves;
   generating a back haptic surface from the set of back haptic surface curves;
   generating a back blend surface; and,
   combining the back optical surface, the back haptic surface, and the back blend surface to form the back lens surface.

4. The method of claim 3, wherein the step of generating a back optical surface, further comprises the steps:
   receiving a set of back surface points;
   generating a back optical surface from the set of back surface points; and,
   trimming the back optical surface.

5. The method of claim 3, further comprising the step of changing a slope of each back haptic surface curve of the set of back haptic surface curves.

6. The method of claim 2, wherein the step of generating a front lens surface from the set of front surface curves, further comprises the steps of:
   generating a front optical surface;
   creating a front haptic surface curve for each front surface curve of the set of front surface curves to create a set of front haptic surface curves;
   generating a front haptic surface from the set of front haptic surface curves;
   generating a front blend surface; and,
   combining the front optical surface, the front haptic surface, and the front blend surface to form the front lens surface.

7. The method of claim 6, wherein the step of generating a front optical surface, further comprises the steps of:
   receiving a set of front surface points;
   generating a front optical surface from the set of front surface points; and,
   trimming the front optical surface.

8. The method of claim 6, further comprises the step of changing a slope of each front haptic surface curve of the set of front haptic surface curves.

9. A system for cutting a scleral contact lens, comprising:
   a computer;
   a camera connected to the computer;
   a lathe connected to the computer;
   the computer including a processor and a non-transitory computer recordable storage medium storing program code which, when executed by the processor, performs a computer implemented method to command the lathe to cut the scleral contact lens, the program code comprising:

program code for capturing, using the camera, a set of sagittal images of an eye of a patient;

program code for extracting, using the computer, a set of back surface curves from the set of sagittal images by creating a corresponding set of points for each sagittal image;

program code for combining all sets of points into a point cloud;

program code for creating, by the computer, a lens image from the point cloud; and program code for cutting, using the lathe as instructed by the computer according to the lens image, a contact lens.

10. The system of claim 9 wherein the program code for combining the set of sagittal images includes additional program code for combining at least two sagittal images by overlapping at least two eye surfaces at a pupillary center of the eye to create a best fit combined eye surface.

11. The system of claim 10 wherein the program code for combining the set of sagittal images includes program code for graphically stitching together the at least two sagittal images.

12. The system of claim 9 wherein the program code for combining the set of sagittal images includes additional program code for combining at least two sagittal images by overlapping at least two eye surfaces and aligning the at least two eye surfaces at a reference point to create a best fit combined eye surface.

13. The system of claim 9 wherein program code for creating the set of back surface curves further comprises additional program code for creating a corresponding spline curve for each sagittal image, and, converting each corresponding spline curve to a corresponding back surface curve.

14. The system of claim 9 wherein the program code further comprises:

program code for generating a back lens surface from the set of back surface curves;

program code for creating a set of front surface curves from the back lens surface;

program code for generating a front lens surface from the set of front surface curves; and program code for converting the lens image to a text file, wherein the program code for cutting includes program code for using the text file to perform the cutting.

15. The system of claim 14 wherein the program code for generating the front surface curves further includes:

program code for generating a front optical surface;

creating a front haptic surface curve for each front surface curve of the set of front surface curves to create a set of front haptic surface curves;

generating a front haptic surface from the set of front haptic surface curves;

generating a front blend surface; and combining the front optical surface, the front haptic surface, and the front blend surface to form the front lens surface.

16. The system of claim 15, wherein the program code further includes:

program code for receiving a set of back surface points;

program code for generating a back optical surface from the set of back surface points; and program code for trimming the back optical surface.

17. The system of claim 15, wherein the program code further includes program code for carrying out changing a slope of each back haptic surface curve of the set of back haptic surface curves.

18. A method implemented in a system comprising a computer connected to a camera and to a lathe, the method comprising:

capturing, using the camera, a set of sagittal images of an eye of a patient;

combining the set of sagittal images into a combined sagittal image to create a best fit combined eye surface;

thereafter creating, by the computer, a lens image using the set of back surface curves wherein creating the set of back surface curves is performed by processing the best fit combined eye surface; and cutting, using the lathe as instructed by the computer according to the lens image, a contact lens.

19. The method of claim 18 further comprising:

generating, using the computer, a back lens surface from the set of back surface curves by:

creating, using the computer, a back haptic surface curve for each back surface curve of the set of back surface curves to create a set of back haptic surface curves;

generating a back haptic surface from the set of back haptic surface curves;

generating a back blend surface; and, combining the back haptic surface and the back blend surface to form the back lens surface; and wherein creating further includes additionally using the back lens surface to create the lens image.

* * * * *